E. T. MATHEWSON.
BUMPER.
APPLICATION FILED OCT. 20, 1920.

1,397,223.

Patented Nov. 15, 1921.

ERNEST T. MATHEWSON
INVENTOR

BY Clarence D. Walker
ATTORNEY

UNITED STATES PATENT OFFICE.

ERNEST T. MATHEWSON, OF BUFFALO, NEW YORK.

BUMPER.

1,397,223.  Specification of Letters Patent.  Patented Nov. 15, 1921.

Application filed October 20, 1920. Serial No. 418,160.

*To all whom it may concern:*

Be it known that I, ERNEST T. MATHEWSON, a citizen of the United States, and resident of Buffalo, Erie county, State of New York, have invented certain new and useful Improvements in Bumpers, of which the following is a specification.

This invention relates to an improvement in bumpers and particularly to the means for attaching the bumper to the vehicle.

One object of this invention is to provide a bracket for attaching a bumper to a vehicle of the type in which the frame has a protruding front end carrying the front springs as for example the Overland Four. This frame is made up of longitudinally extending open sided channel members.

Another object is to provide a bracket which can be quickly and rigidly bolted to the vehicle without the necessity of boring any additional holes in and thus weakening the frame.

A further object is to provide a bracket so formed that the shock received by the bumper is transmitted directly to the frame without putting any undue strain on the bracket holding bolts.

Figure 1:
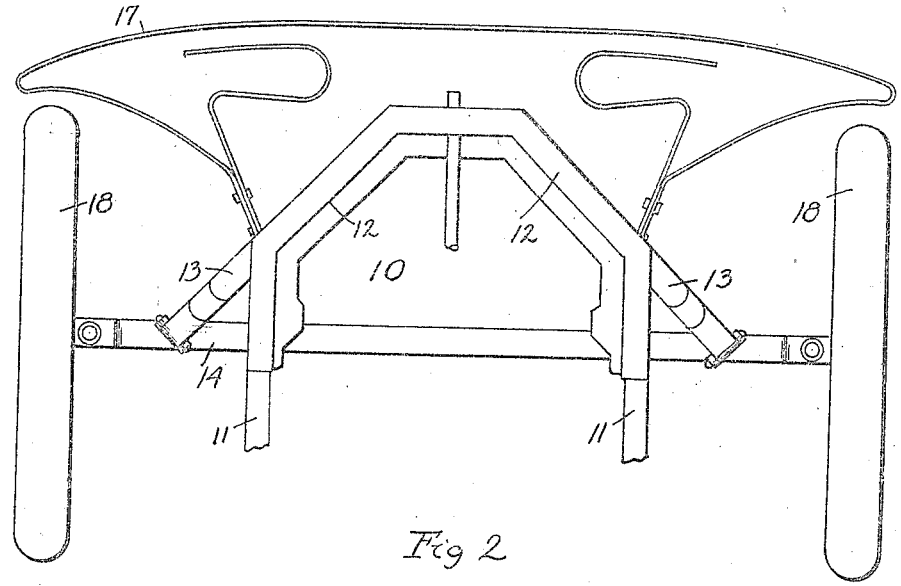
Figure 2:
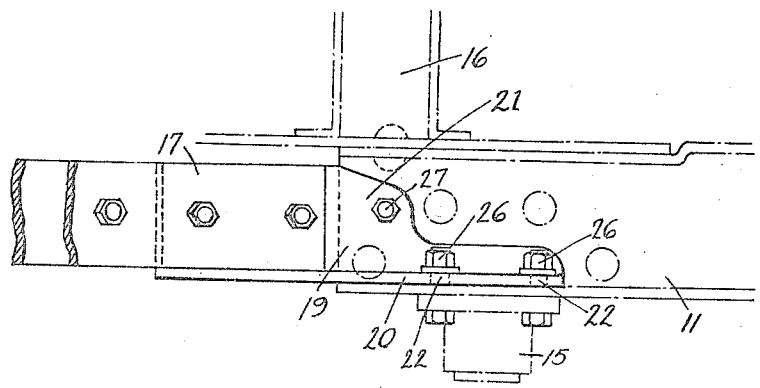
Figure 3:
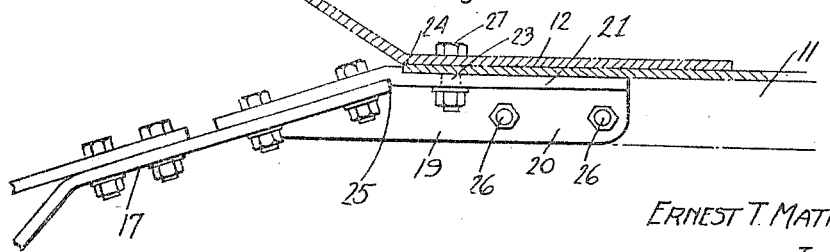

Other objects will appear from a consideration of the specification and the drawings forming a part thereof, and in which, Figure 1 shows a plan view of the front end of a vehicle of the type mentioned above provided with a spring bumper; Fig. 2 shows a side view of the bracket secured in place; and Fig. 3 is a plan view of the same.

In vehicles of the Overland Four type it is impossible to mount a bumper in the usual manner upon the spring horns. By my invention the bumper is securely mounted, and in addition use is made of the bolt holes already provided in the channel members for other purposes thus avoiding the necessity and difficulty of boring additional holes.

Referring to the drawing, the reference numeral 10 designates the front end of a vehicle chassis having longitudinally extending side channel members 11 and projecting front spring plates 12, bolted to the inner sides of the members 11 and carrying the front springs 13. The springs are secured at their inner ends to the front axle 14 and at their outer ends to the plates 12 and normally occupy inclined positions the outer ends being above the inner ends. Bolted to the under side of the members 11 are rubber bumpers 15 above the front axle to take the shock in case the vehicle goes over a severe bump. The numeral 16 indicates a part of the body which is carried by the chassis.

The spring bumper 17 extends in front of the chassis 10 and the wheels 18 as shown in Fig. 1 and is fastened to the channel members by brackets 19. Only one of these brackets, the one on the left side, is illustrated but it will be understood that both are the same and are bolted to the members 11 in the same manner. Each bracket 19 is bent at right angles to form a bottom plate 20, and a side plate 21, having bolt holes 22 in the bottom plate and bolt hole 23 in the side plate. The back of the side plate 21 is cut away to form the shoulder 24 and the front is similarly cut away to form the shoulder 25. When the bracket is mounted on the side member 11 the front end of the latter engages the shoulder 24 and thus determines the proper position of the bracket. In this position the holes 22 in the bottom plate coincide with the bolt holes of the rubber bumper 15, while the hole 23 in the side plate coincides with the bolt holes of the spring plate 12. The bracket is so bolted to the side member by bolts 26 passing through the holes 22 and the bumper bolt holes and by a bolt 27 which passes through the bolt hole 23 and the spring plate bolt hole. The bolts 26 thus hold both the bracket 19 and the bumper 15 to the member 11 while the bolt 27 holds both the bracket and the spring plate to the same member. The bracket is thus quickly and securely fastened to the channel member without weakening it by making additional holes therein.

The end of the spring bumper 17 is bolted to the bracket 19 and is seated against the shoulder 25. Any shock received by the spring bumper is transmitted through the shoulders 25 and 24 directly to the side members and the danger of shearing off the bolts 26 and 27 is avoided. While the bolt holes 22 and 23 are shown round they may be oval if desired, to allow for any variance in the position of the rubber bumper and spring plate holes.

While only one embodiment of this invention has been shown and described, it will be obvious that other embodiments can be made without departing from the spirit and scope of the invention as set forth in the following claims, Although the bumper is described throughout the specification as attached to the front end of the vehicle it is equally adapted to be attached to the rear end of a vehicle such as the Overland Four in which the rear end also protrudes to support the rear springs.

Having thus set forth my invention, what I claim and desire to protect by Letters Patent is:

1. A bracket for attaching a bumper to a vehicle having longitudinally extending channel members, consisting of a right angle plate seated in the channel of one of said members and secured thereto by bolts passing through bolt holes already provided in said members for other purposes.

2. Means for attaching a spring plate bumper to a vehicle having longitudinally extending channel members, consisting of a bracket cut away on both sides to form vertical shoulders, the spring plate of the bumper being fastened to the bracket with its end against one shoulder, and the bracket being secured to one of the said channel members with the front end of the member engaging the other shoulder.

3. In a vehicle having longitudinally extending channel members, a rubber bumper block on the under side of each of said members, a spring plate on the side of said member, a bracket, a spring bumper fastened to said bracket, and means securing said bracket, block, and plate to said channel member.

4. A bracket for attaching a bumper to a vehicle having longitudinally extending channeled side members, comprising a right angle plate seated in and fastened to the channel of one of said members.

In testimony whereof, I affix my signature.

ERNEST T. MATHEWSON.